Aug. 8, 1961 H. BOCK 2,995,651

MIXING ARRANGEMENT

Filed Jan. 28, 1960

INVENTOR
HEINZ BOCK

BY
Frank R. Jerfani
AGENT

United States Patent Office 2,995,651

Patented Aug. 8, 1961

2,995,651

MIXING ARRANGEMENT

Heinz Bock, Hamburg, Germany, assignor to North American Philips Company, Inc., New York, N.Y., a corporation of Delaware Filed Jan. 28, 1960, Ser. No. 5,196
Claims priority, application Germany Feb. 18, 1959
5 Claims. (Cl. 250—20)

The invention relates to a mixing arrangement in which between the anode and the grid of a tube is arranged a circuit tuned to the oscillator oscillations and consisting of a coil, with which two capacitative voltage dividers are connected in parallel, of which the second consists of the series combination of four capacitors $C_1$, $C_2$, $C_3$ and $C_4$, whilst the input oscillations are supplied between the earth-connected junction of the second capacitor $C_2$ and the third capacitor $C_3$, on the one hand, and the tapping point of the first potentiometer consisting of a fifth capacitor $C_5$ and a sixth capacitor $C_6$, on the other hand and, moreover, the anode of the tube is connected to the junction of the first and the second capacitor $C_1$ and $C_2$, the cathode of the tube is connected to the junction of the third and the fourth capacitor $C_3$ and $C_4$ and the grid is connected to the outer connection of the fourth capacitor $C_4$ of the second potentiometer, whereas it applies, at least approximately, that:

$$\frac{C_1}{C_4}=\frac{C_2}{C_3}=\frac{C_5}{C_6}=\frac{1}{V}$$

This mixing arrangement has the advantage that the input circuit is decoupled both for the oscillations from the oscillator and for the output circuit of the amplifying tube (or a different amplifying element), since a double bridge circuit is formed, which is characterized by the aforesaid condition.

Further investigations have shown that particularly when the input oscillations or, as the case may be, the oscillations from the oscillator, as well as the intermediate-frequency oscillations, are of the same order of magnitude, reactions occur since the intermediate-frequency oscillations occur at the grid of the tube, so that often a disturbing negative or positive feed-back occurs. The disturbances may give rise to deformation of the intermediate-frequency curve, which deformation depends upon the amplification properties of the tube and hence varies considerably during the lifetime of the tube or at a replacement thereof. These disadvantages are avoided in the arrangement described above, by supplying the input oscillations via an inductor, which is arranged between the said tappings ($C_2/C_3$ and $C_5/C_6$) with a neutralising capacitor $C_N$ in series, when the relation:

$$\frac{(C_8+C_1).C_3}{C_9}=C_7+\frac{C_N\ \ C_5+C_6)}{C_N+C_5+C_6}$$

applies, wherein $C_7$ designates the capacity between the grid of the tube (R) and earth, $C_8$ the grid-anode capacity and $C_9$ the anode-cathode capacity of the tube (R).

With the aid of the capacitor $C_N$ a bridge circuit for the intermediate-frequency oscillations is formed so that between grid and cathode no or only low intermediate-frequency voltages occur and reactions are avoided substantially completely.

The invention will be described more fully with reference to the drawing.

Figure 1:
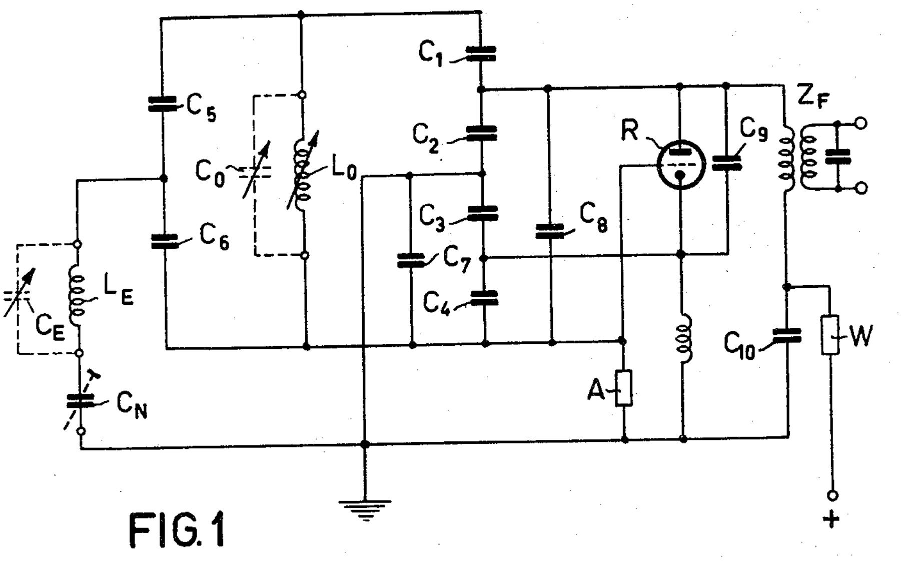
FIG. 1 shows a mixing arrangement according to the invention.

The oscillator circuit is formed by an inductor $L_0$, which serves for tuning and is therefore variable. Parallel herewith is provided a first potentiometer consisting of the capacitors $C_5$ and $C_6$. The input oscillations are fed to an inductor $L_E$ between the junction of the capacitors $C_5$ and $C_6$ and earth.

With the coil $L_0$ is furthermore connected in parallel a potentiometer consisting of the four capacitors $C_1$, $C_2$, $C_3$ and $C_4$. To the junction of the capacitors $C_1$ and $C_2$ is connected the anode of an amplifying tube R, of which the cathode is connected to the junction of the capacitors $C_3$ and $C_4$. The grid, which is connected via a leakage resistor A to earth (or to the cathode) is moreover connected to the outer connection of the capacitor $C_4$. The anode of the tube R is connected via an intermediate-frequence output filter ZF and a resistor W, decoupled by the capacitor $C_{10}$, to the positive terminal of a supply battery, of which the negative terminal is connected to earth.

If the ratio between the impedances of the branches is equal to 1/v., a double bridge is obtained, in which not only a complete decoupling of the input circuit for the oscillations from the oscillator but also of this circuit for the amplified input oscillations prevailing between the anode and the cathode of the tube R.

In proportioning the capacities it should be considered that the ratio between the impedance of the capacitor $C_4$ and the impedance of the series combination of the capacitors $C_2$ and $C_3$ determines the fed-back voltage of the oscillator tube; the impedance Z of a capacitor for oscillations with a frequency $w$ is, as is known: $Z=1/wC$.

The anode of the tube has to lie, moreover, at part of a minimum ohmic value of the oscillator circuit, since then in the event of erroneous adjustment—for instance in the case of a variation in the data of the tube—only slight disturbing reactions on the input circuit occur owing to a high impedance of the capacitor $C_1$ located outside the tube-loaded branch of the potentiometer.

The total capacity of the two branches, together with the inductor $L_0$, is determined by the oscillator frequency.

The subdivision of the branches is determined in that the transmission of the input voltage to the grid-cathode circuit of the tube R is determined by the impedance of the capacitor $C_4$ with respect to the impedance of the series combination of the capacitors $C_3$, $C_4$ and $C_6$. Particularly the capacitor $C_6$ must therefore be great with respect to the capacitor $C_4$. Moreover, $C_3$ must be materially greater than $C_4$. The branch of the capacitor $C_1$ to $C_4$ must therefore have a comparatively high impedance; however, this is limited by the action of the bandfilter ZF, whilst it must be considered that, for example, the grid-cathode capacity $C_8$ of the tube R is connected in parallel with the three capacitors $C_2$, $C_3$ and $C_4$, so that the adjustment may be disturbed thereby. Moreover, when using a second potentiometer having a high impedance disturbing phase shifts occur owing to the impedances having lower values, for example, the grid-input impedance of the tube.

Particularly in the case of high frequencies it is often difficult to obtain a feed-back which is sufficiently great for the oscillator to operate with certainty. In this case the output impedance of the tube R must be at a maximum for the oscillator frequencies, whilst, moreover, the ratio between the alternating grid voltage (via the capacitor $C_4$) and the alternating anode voltage (via the series combination of the capacitors $C_2$ and $C_3$) must also be high. In this respect it is important that the impedance of the capacitor $C_4$ should be materially higher than the impedance of the capacitor $C_3$, preferably 2 to 4.5 or even 10 times higher. A still higher value however, will entail a considerable reduction of the anode impedance, since with $C_4$ also $C_1$ and with $C_3$ also $C_2$ are to be varied in the same sense in order to maintain the said equilibrium condition for the bridge.

In order to obtain a stronger coupling the bridge ratio must be approximately of the order of 1, for example, 0.5 to 2.

The oscillator circuit may also be tuned by varying its capacitative impedance. In this case the correct bridge adjustment must be maintained; this is ensured in the simplest manner by connecting in parallel with the coil, $L_0$ a tuning capacitor $C_0$.

With the circuit arrangement described it has been found that the intermediate-frequency oscillations across the bridge circuit are capable of attaining the grid-cathode circuit of the tube R, so that in accordance with the phase, the positive or the negative feed-back occurs. This may involve unwanted deformations, particularly, since the tube properties exert a great influence, so that replacement of the tube or ageing thereof are capable of influencing strongly the intermediate-frequency characteristic curve.

These disadvantages are fairly strongly reduced by connecting in series with the inductor $L_E$ a neutralising capacitor $C_N$.

Figure 2:
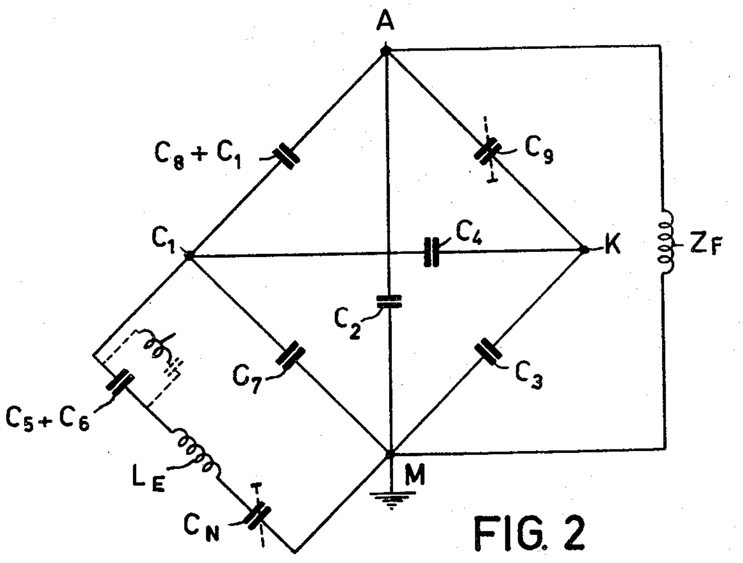
FIG. 2 shows the substitute diagram of the intermediate-frequency oscillations.

For the intermediate-frequency oscillations a bridge circuit is obtained as is shown in FIG. 2. Herein $C_7$ designates the capacity between grid and earth, $C_8$ the grid-anode capacity and $C_9$ the anode-cathode capacity, which could formerly be left out of consideration, but which are important for the adjustment of the bridge shown in FIG. 2.

It may be assumed that the inductor $L_E$ has a comparatively low impedance for the intermediate-frequency oscillations as compared with the neutralizing capacitor $C_N$ and the capacitors $C_5$ and $C_6$; these capacitors are connected in parallel in the bridge in the branch of the input inductance $L_E$, since the oscillator inductance $L_0$ is negligible, particularly, if the oscillator frequency exceeds the input frequency.

From FIG. 2 it can be derived that the bridge is balanced out, so that between grid and cathode of the tube R no intermediate-frequency voltage is operative, if the condition:

$$\frac{(C_8+C_1)}{C_9}=\frac{C_7+\dfrac{C_N(C_5+C_6)}{C_N+(C_5+C_6)}}{C_3}$$

is fulfilled.

Since the neutralizing capacitor $C_N$ is located in a branch, which constitutes a diagonal in the double bridge for the high frequency and the oscillator frequency, the adjustment of this double bridge is not affected.

The intermediate-frequency bridge can be adjusted by varying the capacitor $C_N$. Moreover, the capacitors $C_7$ and $C_8$ can be controlled; in this case, however, a disturbance of the said bridge may occur, if one of the capacitors $C_7$ or $C_8$ attains a value which is no longer negligible with respect to that of the capacitors of the potentiometer $C_1$, $C_2$, $C_3$ and $C_4$.

The bridge shown in FIG. 2 may be adjusted also with the aid of the capacitor $C_9$, which is included in the former double bridge in a diagonal branch, where it does not have a disturbing effect on the bridge equilibrium. It is then possible to choose a high capacitor $C_N$ or even to replace it by a short-circuit. The condition for the intermediate-frequency bridge is then simplified to:

$$\frac{(C_8+C_1).C_3}{C_9}=C_5+C_6+C_7$$

For the adjustment of the frequency the oscillator coil $L_0$ may be tuned by a variation of the inductance, for example, continuously by displacing the core or by switching and/or with the aid of a parallel capacitor $C_0$. It should be considered in this case that the parasitic capacity, particularly of the parallel capacitor, may also have a certain influence on the bridge.

If the input circuit is tuned by a variation of the coil $L_E$, it may be necessary to vary simultaneously also the neutralising capacitor $C_N$, if the inductor $L_E$ has, for the intermediate-frequency oscillations an impedance that must not be neglected with respect to the further impedances of the capacitors $(C_5+C_6)$ and $C_N$ in this branch. If the coil $L_E$ is varied by switching, the capacitor $C_N$ may also be switched over. Also when the input circuit is tuned by the capacitor $C_E$, connected in parallel with the coil $L_E$, it must be investigated whether the impedance of the branch between the grid G and the mass M for the intermediate-frequency is varied consequently. If this is the case, $C_N$ must also be varied.

A compensation of the unwanted negative damping of the intermediate-frequency oscillations occurring particularly when the high-frequency voltages are of the same order as the intermediate-frequency voltage, may also be obtained by connecting, in known manner, an additional damping resistor in parallel or in series with the intermediate-frequency circuit. Thus the operation of the neutralising bridge may be compensated and be replaced at least for a great part so that the requirements for the accuracy of the adjustment are reduced. A further adjustment of the bridge, for example, by switching over the neutralising capacitor $C_N$, is then no longer required.

What is claimed is:

1. A self-oscillating mixer circuit comprising an amplifying device having a control terminal, an output terminal, and a common terminal, a resonant circuit comprising an inductor, and first and second series circuits connected in parallel with said inductor, said first series circuit comprising first, second, third and fourth capacitors in that order, said second series circuit comprising fifth and sixth capacitors, means connecting the junction of said first and second capacitors to said output terminal, means connecting the junction of said second and third capacitors to a point of reference potential, means connecting the junction of said third and fourth capacitors to said common terminal, means connecting the other end of said fourth capacitor to said control terminal, a source of input oscillations, and means connecting said source between said reference potential and the junction of said fifth and sixth capacitors.

2. A self-oscillating mixer circuit comprising an electron discharge device having a control grid, an anode, and a cathode, a resonant circuit tuned to the frequency of self oscillations of said circuit and comprising an inductor connected in parallel with first and second series circuits, said first series circuit comprising first, second, third and fourth capacitors in that order, said second series circuit comprising fifth and sixth capacitors, means connecting said anode to the junction of said first and second capacitors, means connecting the junction of said second and third capacitors to a point of a reference potential, means connecting said cathode to the junction of said third and fourth capacitors, means connecting the junction of said fourth capacitor and coil to said control grid, a source of input oscillations, and means connecting said source between said point of reference potential and the junction of said fifth and sixth capacitors, said source comprising inductive means.

3. A self-oscillating mixer circuit comprising an electron discharge device having a control grid, an anode, and a cathode, a resonant circuit tuned to the frequency of self oscillations of said circuit and comprising an inductor connected in parallel with first and second series circuits, said first series circuit comprising first, second, third and fourth capacitors in that order, said second series circuit comprising fifth and sixth capacitors, means connecting said anode to the junction of said first and second capacitors, means connecting the junction of said second and third capacitors to a point of reference potential, means connecting said cathode to the junction of said third and fourth capacitors, means connecting the junction of said fourth capacitor and coil to said control grid, a source of input oscillations, means connecting said source between said point of reference potential and the junction of said fifth and sixth capacitors, said source comprising series connected inductor means and neutralizing capacitor means, the values of said capacitors satisfying the following relationships:

$$\frac{C_1}{C_4}=\frac{C_2}{C_3}=\frac{C_5}{C_6}$$

and $$\frac{(C_8+C_1)C_3}{C_9}=C_7+\frac{CN(C_5+C_6)}{CN+(C_5+C_6)}$$

where $C_1$, $C_2$, $C_3$, $C_4$, $C_5$, $C_6$ and $C_N$ are respectively the capacitances of said first, second, third, fourth, fifth, sixth and neutralizing capacitors, $C_1$ is the capacity between said control grid and point of reference potential, $C_8$ is the grid to anode capacity of said discharge device, and $C_9$ is the anode to cathode capacity of said discharge device.

4. The circuit of claim 3 comprising means for deriving intermediate frequency oscillations connected between said anode and said point of reference potential.

5. The circuit of claim 3 comprising tuning capacity means connected in parallel with said inductor.

References Cited in the file of this patent

UNITED STATES PATENTS 2,823,305 Aschermann ------------ Feb. 11, 1958

FOREIGN PATENTS 1,114,121 France ------------------ Dec. 12, 1955

UNITED STATES PATENT OFFICE

CERTIFICATE OF CORRECTION

Patent No. 2,995,651 August 8, 1961

Heinz Bock

It is hereby certified that error appears in the above numbered patent requiring correction and that the said Letters Patent should read as corrected below.

Column 5, line 15, for "$C_1$" read -- $C_7$ --.

Signed and sealed this 19th day of December 1961.

(SEAL)
Attest:

ERNEST W. SWIDER
Attesting Officer

DAVID L. LADD
Commissioner of Patents

USCOMM-DC